United States Patent [19]

Shibasaki et al.

[11] Patent Number: 4,542,995
[45] Date of Patent: Sep. 24, 1985

[54] THRUST BEARING SUPPORTING DEVICE FOR AN ELECTRIC ROTARY MACHINE

[75] Inventors: Kazunori Shibasaki; Kenji Sawatani, both of Kobe, Japan

[73] Assignee: Mitsubishi Denki Kabushiki Kaisha, Tokyo, Japan

[21] Appl. No.: 506,615

[22] Filed: Jun. 22, 1983

[30] Foreign Application Priority Data

Jun. 29, 1982 [JP] Japan ............................ 57-99717[U]

[51] Int. Cl.⁴ ........................ F16C 27/08; F16C 17/06
[52] U.S. Cl. .................................... 384/224; 384/306; 384/308
[58] Field of Search ................................ 384/302–312, 384/226, 224, 248–251, 368–371, 470, 99, 121–124

[56] References Cited

U.S. PATENT DOCUMENTS 2,778,696 1/1957 Lease ................................. 384/308
3,550,973 12/1970 Kitano et al. ..................... 384/224
3,764,187 10/1973 Kuhn ................................. 384/306

FOREIGN PATENT DOCUMENTS 695080 9/1964 Canada ............................. 384/303
57453 5/1977 Japan ............................... 384/303
43156 4/1978 Japan .
166143 11/1980 Japan .
332826 7/1930 United Kingdom ............... 384/303

Primary Examiner—Stuart S. Levy
Assistant Examiner—Thomas R. Hannon
Attorney, Agent, or Firm—Oblon, Fisher, Spivak, McClelland & Maier

[57] ABSTRACT

A thrust bearing supporting device for an electric rotary machine comprises a plurality of supporting members fixed to a base plate within a bearing vessel for supporting a thrust bearing of said rotary machine, each of said supporting members consisting of a pair of supporting pieces, each of said supporting pieces having a recessed portion formed therein, wherein each of said supporting members is formed by placing one supporting piece on the other in face-to-face relationship thereby forming a space within each of said supporting members.

8 Claims, 5 Drawing Figures

FIGURE 1 *PRIOR ART*

THRUST BEARING SUPPORTING DEVICE FOR AN ELECTRIC ROTARY MACHINE

BACKGROUND OF THE INVENTION

1. Field of the Invention

The present invention relates to a device for supporting a thrust bearing of an electric rotary machine.

2. Description of the Prior Art

As this type of the device, there has so far been known such one as shown in FIG. 1.

In FIG. 1, the reference numeral 1 designates a rotor of an electric rotary machine; the numeral 2 designates a shaft connected to the rotor 1 by means of a plurality of fastening bolts 3; the numeral 4 designates a bearing vessel in which a lubricating oil is filled; the numeral 5 designates a thrust bearing of so-called a Kingsbury type which is provided with an optional number of sector-shaped pads; the numeral 6 designates a base plate; the numeral 7 designates a plurality of supporting bolts which are fitted into respective threaded holes formed in the base plate 6 and each has an end passing through the bearing vessel 4 so as to allow adjustment of the height of the bolts in the bearing vessel 4 from the outside; the numeral 8 designates a cap for receiving the lubricating oil which may leak from the threaded holes to which the supporting bolts 7 are respectively fitted; the numeral 9 designates fitting bolts and the numeral 10 designates a supporting bed.

Description will be made as to the manner of supporting of the rotor of an electric rotary machine.

The weight i.e. the thrusting force of the rotor 1 of the electric rotary machine is applied through the shaft 2 to the thrust bearings 5, hence to the supporting bolts 7. The thrusting force is further transmitted from the supporting bolts 7 through the bearing vessel 4 to the supporting bed 10.

In the conventional device constructed as described above, it is necessary to adjust many times the height of the supporting bolts during the assembling operation so that the thrust bearings 5 are subjected to a uniform thrusting force. Furthermore, as a result of such construction that the supporting bolts 7 pass through the bearing vessel 4, the lubricating oil in the vessel 4 easily leaks out from the vessel. For this, it is necessary to provide a cap for each of the supporting bolts with the consequence of causing a complicated structure. The conventional device has further disadvantage that the lubricating oil may leak out from the contacting surface of the flange of the cap.

SUMMARY OF THE INVENTION

It is an object of the present invention to overcome the disadvantage of the conventional device and to provide a thrust bearing supporting device for an electric rotary machine having a simple structure which prevents the leakage of a lubricating oil and allows uniform distribution of a thrusting force without any adjusting operation.

The foregoing and the other objects of the present invention have been attained by providing a thrust bearing supporting device for an electric rotary machine comprising: a plurality of supporting members fixed to a base plate within a bearing vessel for supporting a thrust bearing of said rotary machine; each of said supporting members consisting of a pair of supporting pieces; each of said supporting pieces having a recessed portion formed therein; wherein each of said supporting members is formed by placing one supporting piece on the other in face-to-face relationship thereby forming a space within each of said supporting members.

These and other objects as well as specific construction and function of the thrust bearing supporting device of the present invention will become more apparent and understandable from the following detailed description thereof, when read in conjunction with the accompanying drawings.

DETAILED DESCRIPTION OF PREFERRED EMBODIMENTS

A first embodiment of the present invention will be described with reference to FIGS. 2 to 4.

Figure 1:
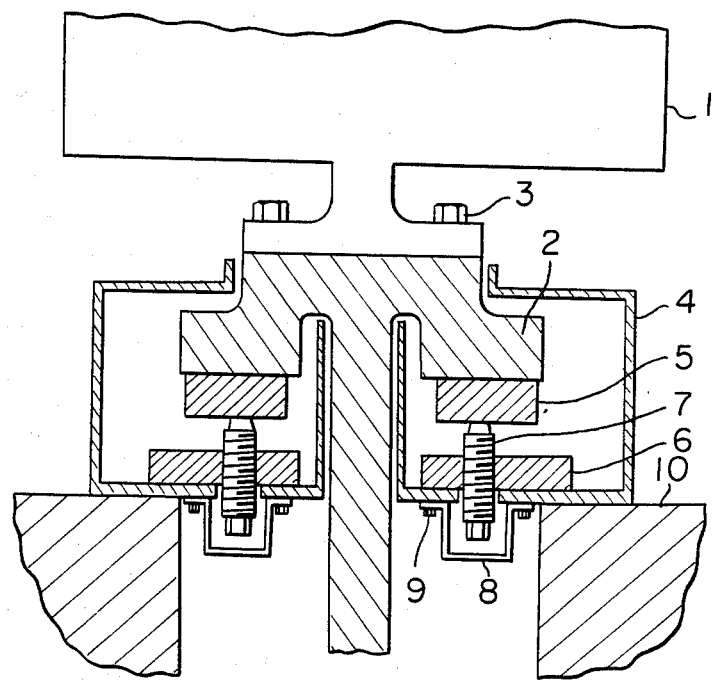
FIG. 1 is a cross sectional view of the conventional thrust bearing supporting device for an electric rotary machine.
Figure 2:
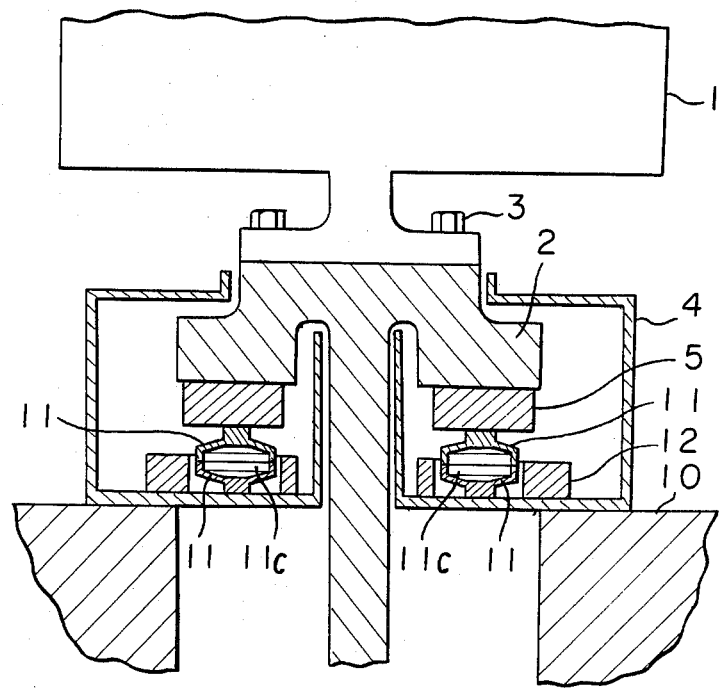
FIG. 2 is a cross sectional view of an embodiment of the thrust bearing supporting device for an electric rotary machine according to the present invention.
Figure 3:
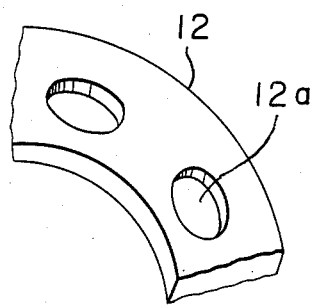
FIG. 3 is a perspective view partly broken of a table plate in FIG. 2.
Figure 4:
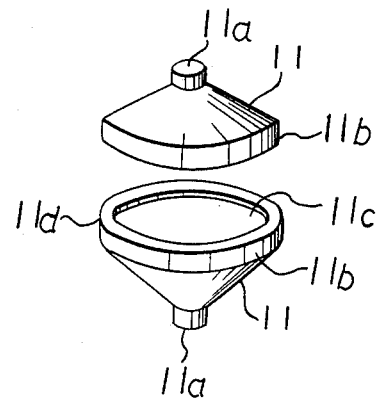
FIG. 4 is a perspective view of a pair of supporting pieces in FIG. 2.

In FIGS. 2, 3 and 4, the rotor 1, the shaft 2, the fastening bolts 3, the bearing vessel 4, the thrust bearings 5 and the supporting bed 10 are the same as those of the conventional device as shown in FIG. 1. The description will therefore be omitted. The supporting piece 11 is made of metal such as steel having a rigidity and a flexibility. The supporting piece 11 is formed into a generally conical shape as shown in FIG. 4. It has a cylindrical boss 11a at the top of a conical section and a cylindrical skirt portion 11b at the lower part of the conical section. In the bottom surface of the supporting piece, a recessed portion 11c is formed leaving an annular rim 11d. The height of the rim 11d is smaller than that of the skirt portion 11b in FIG. 4. However, the depth of the recessed portion 11c may be substantially the same as the height of the skirt portion 11b. It is possible to form the recessed portion 11c into a conical shape to give a uniform thickness for the side wall of the supporting piece 11. It is desired for the supporting piece to be paired to give the same configuration because of good productivity.

The supporting piece 11 is placed one on the other with each bottom surface being faced. Since the supporting piece 11 is provided with a recessed portion 11c in its bottom surface, the supporting member formed by stacking two supporting pieces 11 has a space in the opposed surfaces of the supporting pieces which imparts a desired spring action. The supporting piece 11 is so precisely shaped that when two supporting pieces are made paired to constitute a supporting member the height of each supporting device is substantially the same.

The supporting member is placed in each hole 12a formed along the circle line in a ringed table plate 12 to support the thrust bearing 5. The table plate 12 gives a stable seat to the supporting member.

In the thrust bearing supporting device thus constructed, when a thrusting force is applied through the shaft 2 to thrust bearings 5 circularly arranged, each of the thrust bearings 5 being supported by a plurality of the supporting members constituted by each pair of the supporting pieces 11, the thrusting force is born by the supporting bed 10 via the supporting members and the bearing vessel 4.

Since the supporting piece 11 is so fabricated that it has a sufficient flexibility, the thrusting force applied to each thrust bearings 5 is substantially equal due to the flexibility of the paired supporting pieces even when there is some ununiformity in height between paired supporting pieces 11 when assembled.

Figure 5:
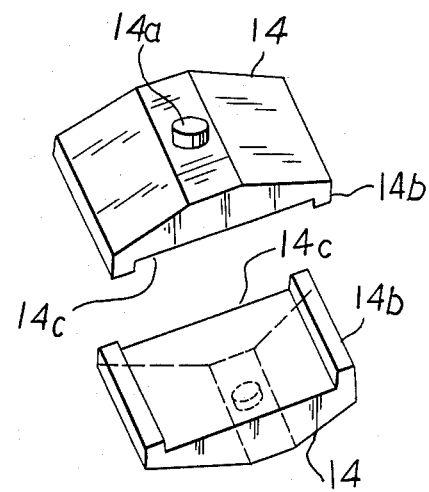
FIG. 5 is a perspective view of another embodiment of the supporting pieces of the present invention.

FIG. 5 shows a second embodiment of the supporting member of the present invention.

A supporting piece 14 constituting the supporting member is formed into a generally trapezoid shape. It has a cylindrical boss 14a in the middle of the upper surface and a pair of legs 14b extending downward at opposed end portion of the bottom thereby providing a recessed portion 14c. The same function as that of the supporting member shown in FIG. 4 can be obtained.

As described above, in accordance with the present invention, a thrusting force can be uniformly distributed to thrust bearings without any adjustment of the supporting members, the supporting member consisting of two supporting pieces which are placed one on the other and in face-to-face relationship with a space in the facing surfaces.

We claim:

1. A thrust bearing supporting device for an electric rotary machine, said device comprising:
   (a) a bearing vessel;
   (b) a plurality of thrust bearings disposed in said bearing vessel in position to support the shaft of an electric rotary machine; and
   (c) a plurality of supporting pieces disposed in said bearing vessel, at least one of said supporting pieces being disposed between each of said thrust bearings and an inner wall of said bearing vessel so as to transmit the thrusting force of the electric rotary machine to the inner wall of said bearing vessel, each of said plurality of supporting pieces being symmetric about an axis perpendicular to the associated one of said thrust bearings and comprising:
      (i) a first member having a cylindrical boss having a first flat, circular working surface bearing against the associated one of said thrust bearings, a hollow conical portion depending directly from said cylindrical boss, and a hollow cylindrical portion depending directly from said hollow conical portion, said hollow cylindrical portion terminating in a first flat, annular working surface, and;
      (ii) a second member having a cylindrical boss having a second flat, circular working surface bearing against the inner wall of said bearing vessel, a hollow conical portion depending directly from said cylindrical boss, and a hollow cylindrical portion depending directly from said hollow conical portion, said hollow cylindrical portion terminating in a second flat, annular working surface,
      (iii) the first flat, annular working surface on the hollow cylindrical portion of said first member bearing against the second flat, annular working surface on the hollow cylindrical portion of said second member.

2. A thrust bearing supporting device as recited in claim 1 wherein said thrust bearings are of the Kingsbury type.

3. A thrust bearing supporting device as recited in claim 1 wherein said first and second members are made of spring steel.

4. A thrust bearing supporting device as recited in claim 1 wherein said first and second members are identical to each other.

5. A thrust bearing supporting device as recited in claim 1 wherein the thickness of the walls of the hollow conical portion and the hollow cylindrical portion of said first member is uniform.

6. A thrust bearing supporting device as recited in claim 5 wherein the thickness of the walls of the hollow conical portion and the hollow cylindrical portion of said second member is uniform.

7. A thrust bearing supporting device as recited in claim 1 wherein the thickness of the walls of the hollow conical portion and the hollow cylindrical portion of said second member is uniform.

8. A thrust bearing supporting device as recited in claim 1 and further comprising a table plate in the form of an annular ring disposed in said bearing vessel and positioned against the inner wall of said bearing vessel, said table plate having a plurality of through holes therethrough which are perpendicular to said thrust bearings, at least one of said supporting pieces being disposed in each of said through holes.

* * * * *